(12) United States Patent
Gold et al.

(10) Patent No.: US 6,189,836 B1
(45) Date of Patent: Feb. 20, 2001

(54) MODEL-FOLLOWING CONTROL SYSTEM USING ACCELERATION FEEDBACK

(75) Inventors: Phillip Jeremy Gold, Shelton; John Randall Mayo, Newtown, both of CT (US)

(73) Assignee: Sikorsky Aircraft Corporation, Stratford, CT (US)

(*) Notice: Under 35 U.S.C. 154(b), the term of this patent shall be extended for 0 days.

(21) Appl. No.: 09/160,598

(22) Filed: Sep. 25, 1998

(51) Int. Cl.[7] .................................................. G05D 1/00
(52) U.S. Cl. .................. 244/191; 244/76 C; 244/76 R; 244/17.13; 701/4; 701/10
(58) Field of Search .................. 244/76 C, 191, 244/76 R, 181, 183, 184, 17.13, 177; 701/4, 10

(56) References Cited

U.S. PATENT DOCUMENTS

| | | | |
|---|---|---|---|
| 3,240,447 | * 3/1966 | Olshausen | 244/76 C |
| 3,711,042 | * 1/1973 | Rempfer et al. | 244/191 |
| 4,697,768 | * 10/1987 | Klein | 224/191 |
| 4,725,020 | * 2/1988 | Whitener | 244/76 C |
| 4,819,182 | 4/1989 | King et al. | 364/508 |
| 4,821,981 | * 4/1989 | Gangsaas et al. | 244/76 C |
| 4,905,934 | * 3/1990 | Chin | 244/76 C |
| 4,989,466 | 2/1991 | Goodman | 74/5.22 |
| 5,124,938 | 6/1992 | Algrain | 364/566 |
| 5,222,691 | 6/1993 | Gold et al. | 244/17.013 |
| 5,327,161 | 7/1994 | Gullapalli | 318/649 |
| 5,418,858 | 5/1995 | Shoureshi | 381/71 |
| 5,615,119 | 3/1997 | Vos | 364/424.013 |
| 5,713,438 | 2/1998 | Rossetti et al. | 188/378 |
| 5,722,620 | * 3/1998 | Najmabadi et al. | 244/191 |
| 5,738,300 | 4/1998 | Durand | 244/17.13 |
| 5,819,188 | 10/1998 | Vos | 701/4 |

* cited by examiner

Primary Examiner—J. Woodrow Eldred
(74) Attorney, Agent, or Firm—Fitzpatrick, Cella, Harper & Scinto

(57) ABSTRACT

A feedback system for reducing the effects of destabilizing forces in a vehicle (e.g. helicopter) by utilizing acceleration feedback data sensed by an acceleration sensor located in the vehicle. This sensed acceleration signal is passed through a low-pass filter and combined with a command signal to produce an error signal. The error signal is multiplied by a predetermined gain to produce a corrective signal that is utilized by actuators to adjust an adjustable surface, such as a swashplate, on the vehicle.

21 Claims, 11 Drawing Sheets

MODEL-FOLLOWING CONTROL SYSTEM USING ACCELERATION FEEDBACK

BACKGROUND OF THE INVENTION

1. Field of the Invention

This invention relates generally to a control system for an aircraft using acceleration feedback data to compensate for destabilizing forces exerted on the aircraft. More particularly, this invention relates to an aircraft model-following control system using acceleration feedback data that is combined with a command input to generate an error signal to compensate for destabilizing forces exerted on the aircraft. This feedback system results in reduced oscillational effects on the aircraft.

2. Brief Description of the Art

Aircraft, such as helicopters and fixed wing airplanes are subject to forces in the X (roll), Y (pitch) and Z (yaw) rotational directions. Destabilizing roll, pitch and yaw forces influence the flight path of the aircraft. These forces, also referred to as oscillations, can be external forces such as wind gusts, or internal forces, such as rotor aeroelastic resonance, or a combination of internal and external forces. The destabilizing forces present ride comfort problems and adversely affect aiming accuracy during targeting tasks. Regardless of the source of the destabilizing forces, in order to maintain a stable flight path, it is necessary to compensate for these forces.

Various conventional helicopters and fixed wing airplanes generally have only a primary flight control system (PCFS). In an aircraft with only PFCS, the operator of the aircraft must manually adjust the command stick in the control section of the aircraft to actuate a compensation force to offset the destabilization forces exerted on the aircraft. In an aircraft such as a helicopter, the operator must move the command stick to actuate a swashplate that will alter the pitch of the rotor blades in an attempt to compensate for destabilization forces experienced by the helicopter. These primary flight control systems (PFCS) do not include active feedback mechanisms to dynamically adjust or compensate for roll, pitch, and yaw forces exerted on the aircraft.

More progressive aircraft have an automatic flight control system (AFCS) in addition to the PFCS. The AFCS includes feedback mechanisms to compensate for undesired destabilization forces acting on the aircraft. The conventional AFCS utilize rate and attitude feedback to programmably adjust for destabilization forces exerted on the aircraft. Unfortunately, the rate and attitude vectors received from sensors on the aircraft do not always adequately adjust for the destabilization forces acting on the aircraft. This poor response to destabilization forces prohibits the aircraft from maintaining the desired stable flight path.

Some current production helicopters feature a hingeless or bearingless main rotor (BMR) design, which rely on aero-mechanical control of the rotor and typically stabilize aircraft oscillations using conventional digital flight control solutions. Unfortunately, the BMR design inherently generates blade lead-lag oscillations that can significantly degrade flight path stability. The use of elastomeric flexing to dampen blade lead-lag motion is limited by the relatively small amplitude of blade motion.

Several references disclose vibration-reducing systems and are discussed as follows:

U.S. Pat. No. 4,819,182 entitled, "Method and Apparatus for Reducing Vibration of a Helicopter Fuselage", issued to Stephen P. King et al. discloses a method of reducing vibration of a helicopter fuselage using actuators and accelerometers. This reference does not disclose using an input from the operator, or any intelligence from a model.

U.S. Pat. No. 4,989,466 entitled, "Gyroscopically Stabilized Sensor Positioning System", issued to Ronald C. Goodman discloses a stabilized platform for mounting a camera or other sensor that is suspended from a support post. A universal joint is powered by a torque motor. A gyro stabilizer comprising three orthogonally arranged gyroscopes is mounted on the platform. Position sensors detect the angles of the three gyroscopes and provide inputs to servo control loops. This reference does not disclose using pilot input as a component of the stabilizing force nor does it disclose combining pilot input with acceleration feedback.

U.S. Pat. No. 5,124,938 entitled "Gyroless Platform Stabilization Techniques", issued to Marcelo C. Algrain, discloses an apparatus for platform stabilization. The apparatus uses linear and/or angular accelerometers to derive the roll, pitch and yaw components of the angular velocity of the vehicle the apparatus is mounted on. A control system implements a velocity control system or an acceleration control system. This reference does not disclose combining the output of the accelerometers with pilot command signals to reduce the effects of rotor oscillations.

U.S. Pat. No. 5,222,691 entitled "Automatic Turn Coordination Trim Control for Rotary Wing Aircraft", issued to Philip J. Gold et al., discloses a helicopter flight control system that uses an automatic turn coordination system that provides a coordinating yaw command signal to the tail rotor of the helicopter. The system stores on command signals indicative of bank angle, lateral ground speed and lateral acceleration thereby providing the pilot with automatic turn coordination about attitudes other than wings level. This reference does not disclose using acceleration vector data as feedback to reduce vibrations in the aircraft.

U.S. Pat. No. 5,634,794 entitled "Aircraft Simulator and Method", issued to Bruce L. Hildreth et al., discloses an apparatus and method for simulating a desired response in accordance with an external applied force. The apparatus includes a member that is responsive to the applied force, an actuator coupled to the member, and a force sensor for detecting the applied force. This reference does not disclose using acceleration vector data as feedback.

U.S. Pat. No. 5,713,438 entitled "Method and Apparatus for Non-Model Based Decentralized Adaptive Feedforward Active Vibration Control", issued to Dino J. Rossetti et al., discloses a system for implementing a non-model based decentralized feedforward adaptive algorithm for active vibration control of an actively-driven element. The element includes preferably an inertial tuning mass and a voice coil assembly and is contained in an active vibration control system. This reference does not disclose using a model-following system.

All of these U.S. patents are hereby incorporated by reference in their entirety herein.

The present state of the art does not provide adequate path stabilization for a vehicle. The instant invention provides a solution to this problem by using acceleration feedback data and input command signals to reduce the effects of destabilizing forces on a vehicle.

BRIEF SUMMARY OF THE INVENTION

An object of the present invention is to provide a control system that utilizes sensed acceleration data in a model-following feedback system to effectively compensate for undesired destabilization forces affecting vehicle flight path.

Accordingly, one embodiment of the instant invention is drawn to a system that uses actuators to control portions of a vehicle in order to reduce destabilizing forces, such as oscillations, wind gusts or any force that destabilizes the flight path of the vehicle. In an embodiment in which the vehicle is a helicopter, the control is effectuated by adjusting an actuator to control a swashplate. The vehicle swashplate is the mechanical means by which control system servo-actuator (the servo-actuator is also referred to as "servo" or "actuator" herein) motion changes the main rotor blade pitch, and vehicle flight path accordingly. This system includes an accelerometer mounted on the vehicle and used to generate acceleration feedback signals, which are a function of sensed vehicle motion. A command signal circuit is coupled to the vehicle for receiving pilot command signals and producing command signals that are a function of the pilot command signals.

An accumulation circuit is coupled to the command signal circuit and receives a first command signal and the acceleration feedback signal from the respective sources. The accumulation circuit sums the first command signal with the acceleration feedback signal thereby producing an acceleration error signal. An amplifier, having a predetermined gain, is coupled to the accumulation circuit for multiplying the acceleration error signal by the predetermined gain thereby producing an amplified acceleration error signal.

A first summing circuit is coupled to the amplifier for summing the amplified acceleration error signal with a second command signal received from the command signal circuit, thereby producing a composite output signal. An actuator is coupled to the first summing circuit for receiving the composite output signal and changes its position in accordance with the composite output signal. The change in actuator position causes an adjustable surface to change position.

A second embodiment of the instant invention is drawn to a method for reducing destabilizing forces of a vehicle. This method includes the steps of generating acceleration feedback signals corresponding to motion sensed within the vehicle;

generating command signals that correspond to a pilot input command signal;

summing the acceleration feedback signals and a first command signal thereby producing an acceleration error signal;

multiplying the acceleration error signal by a gain thereby producing an amplified acceleration error signal;

summing the amplified acceleration error signal and a second command signal to produce a composite output signal; and outputting the composite output signal to an actuator thereby causing the actuator to change position in response to the composite output signal.

A third embodiment of the instant invention is drawn to an apparatus for reducing destabilizing forces of a vehicle. The apparatus includes actuators mounted to the vehicle. The actuators are used to control a portion of the vehicle, such as a swashplate or other adjustable surface of the vehicle. A microcomputer is coupled to the actuators and receives input signals therefrom and transmits output signals thereto. An inertial sensor, such as an accelerometer, is coupled to the microcomputer for sensing motion of the vehicle and transmitting sensed motion signals to the microcomputer. A control device is coupled to the microcomputer for generating control signals and transmitting the control signals to the microcomputer. The microcomputer utilizes acceleration feedback data received from the inertial sensors and the control signals received from the control device to generate an output signal representative of the difference between the control signals and the acceleration data. The microcomputer transmits the output signal to the actuators so that the actuators will adjust their position and adjust the position of an adjustable surface in accordance with the output signal.

A fourth embodiment of the instant invention is drawn to a method for reducing destabilizing effects in a vehicle. The method includes the steps of:

generating a command signal from pilot input corresponding to desired vehicle motion;

generating an acceleration feedback signal corresponding to vehicle motion sensed by at least one non-pilot controller sensor;

generating an acceleration error signal representative of the sum of the command signal and the acceleration feedback signal;

processing the acceleration error signal to produce a composite signal;

outputting the composite signal to an actuator; and adjusting the actuator in response to the composite signal transmitted to the actuator.

A fifth embodiment of the instant invention is drawn to a method for generating an acceleration error signal in a flight simulation apparatus. This method comprises:

generating an acceleration feedback signal corresponding to the flight simulation apparatus motion;

generating a command signal corresponding to a pilot input;

generating an acceleration error signal representative of the sum of the acceleration feedback signal and the command signal; and utilizing the acceleration error signal to determine flight path stability of the flight simulation apparatus.

DETAILED DESCRIPTION OF THE INVENTION

The instant invention is a flight control system with improved feedback that utilizes the acceleration vector as a source of feedback data for enhanced vehicle flight path stability. Vehicles include helicopters, fixed wing aircraft and any apparatus having an adjustable surface. Vehicles also include flight simulator apparatus with a simulated adjustable surface. The adjustable surface is suitably a swashplate of a helicopter or a movable portion of the wing of an airplane. The adjustable surface is in communication with the servo-actuator, such that the servo-actuator can control the position of the adjustable surface by movement of the servo-actuator. The servo-actuator is suitably connected to linkages or fittings that are connected to the adjustable surface of the vehicle. Thus, motion of the servo-actuator will affect the position of the adjustable surface of a vehicle. The acceleration feedback is used to reduce vehicle motion induced from vehicle components, such as main rotor aeroelastic resonance. This is particularly prevalent helicopters that employ a bearingless main rotor and helicopters that have a relatively low moment of inertia about one of its axis, making it extremely susceptible to undesired roll forces. A model-following system using acceleration vector data combined with input relating to the pilot's desired response is desirable since the rate and attitude vectors take longer to convert to input data since they represent first and second integrals of the acceleration vector. The model-following aspect enables the destabilizing forces to be dampened more quickly since command actions and reactions of the vehicle are synthesized together.

Figure 1:
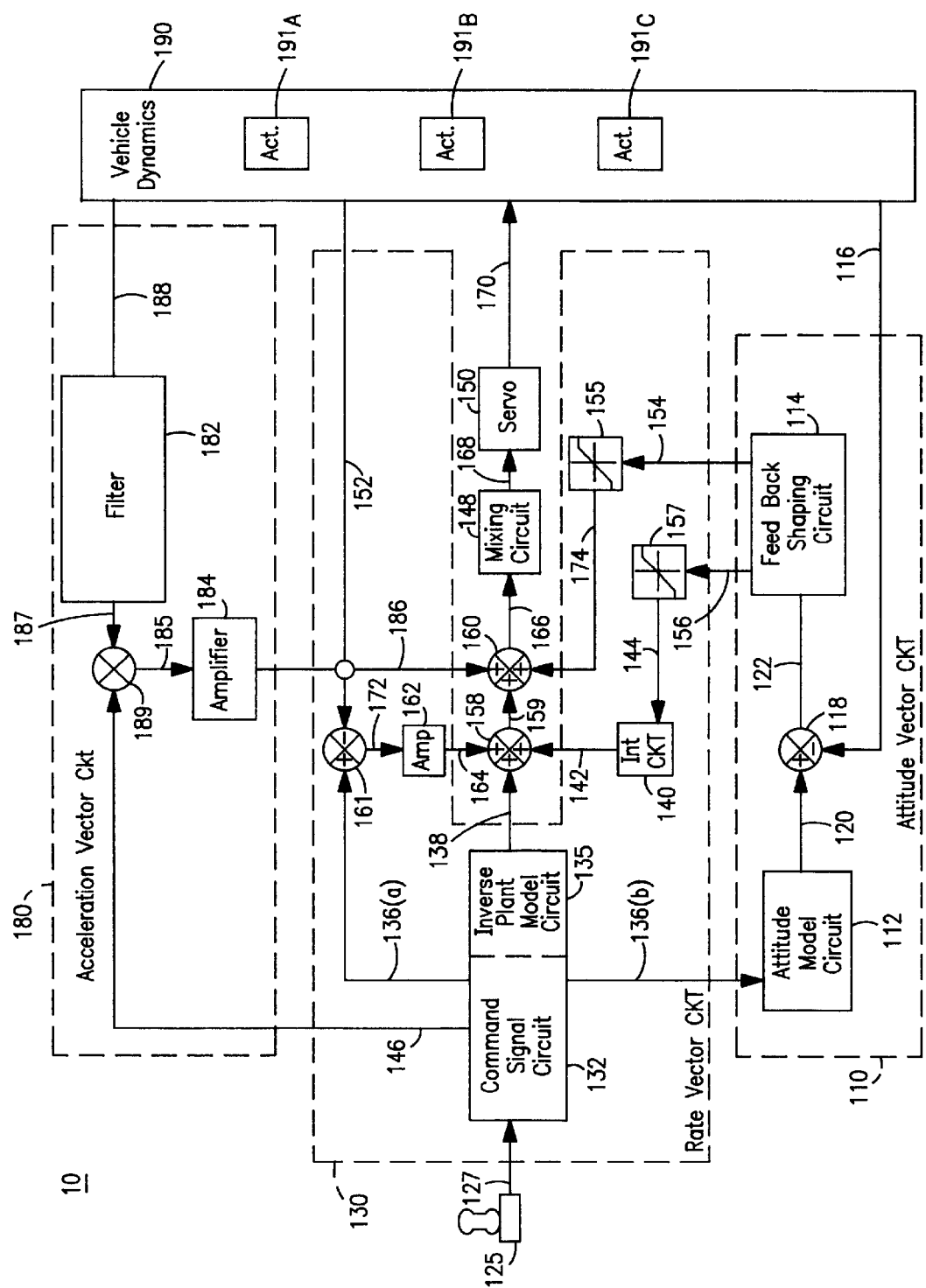
FIG. 1 is a diagram of a first embodiment of the instant invention.
Figure 2:
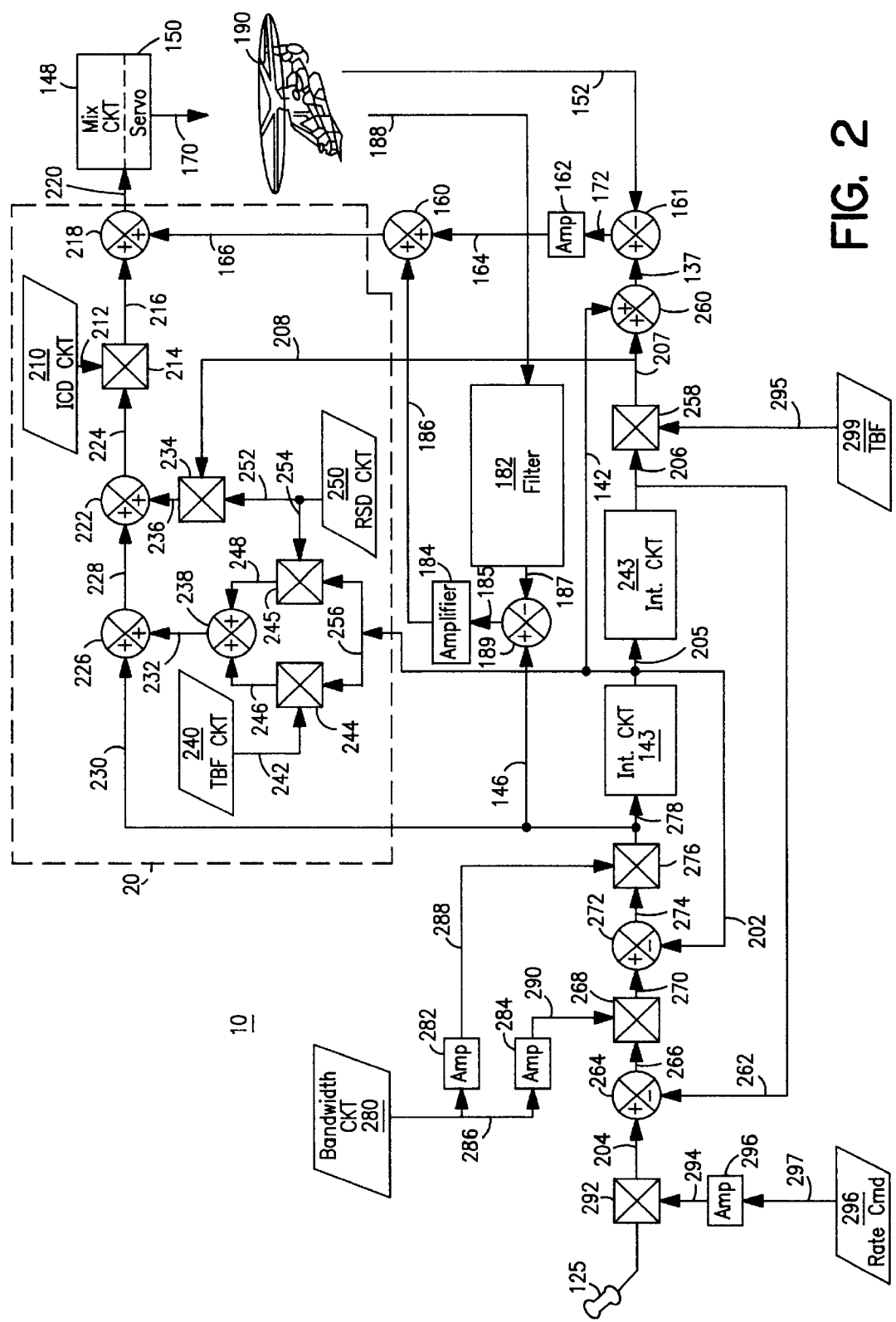
FIG. 2 is a diagram of a second embodiment of the instant invention.
Figure 3:
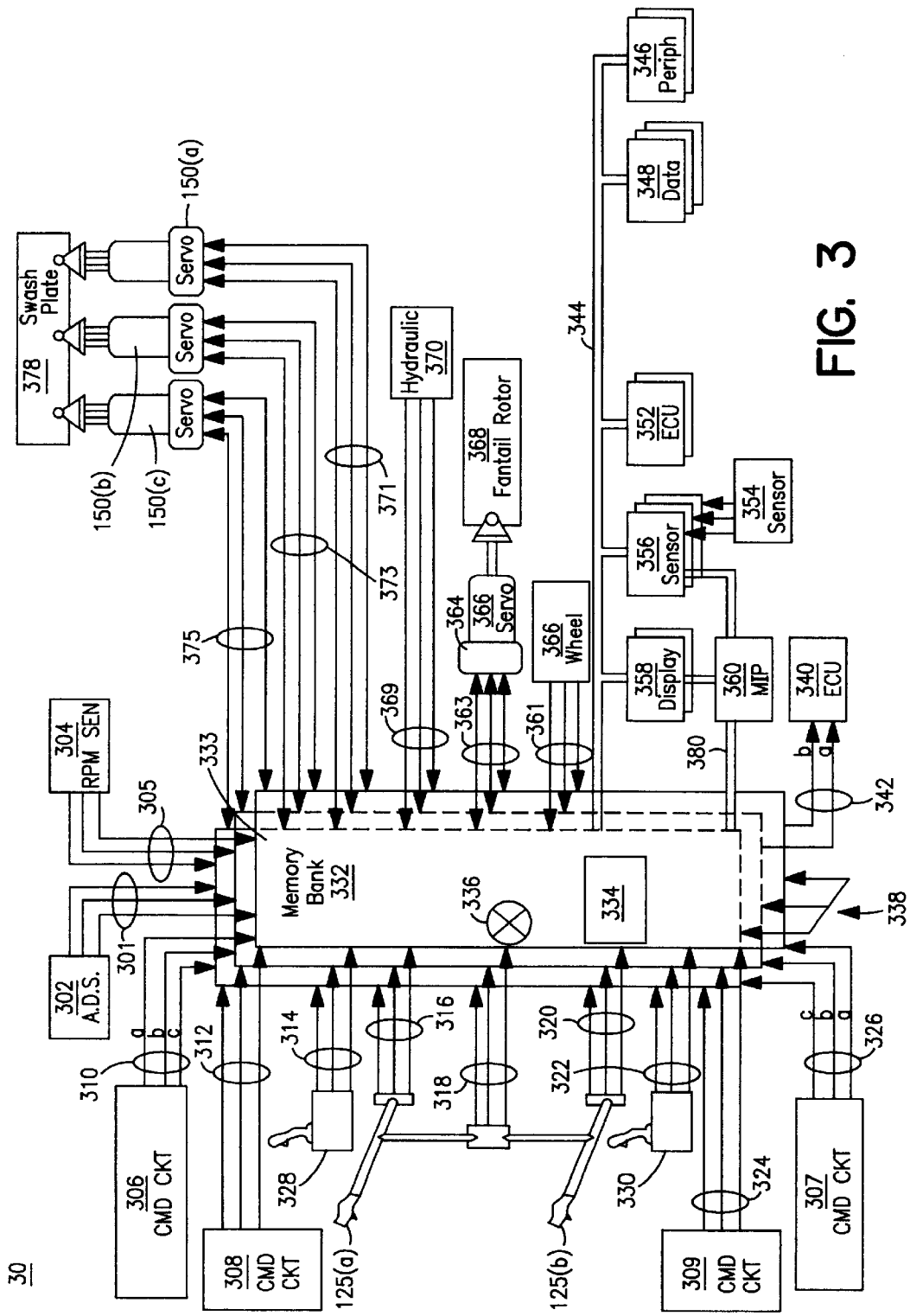
FIG. 3 is a schematic illustration of a third embodiment of the instant invention.

Referring now to the drawings where like reference numerals identify corresponding or similar elements throughout the several views, FIGS. 1–3 show three embodiments of the instant invention. It should be noted that the acceleration feedback vector described herein is described in terms of the roll vector but the invention also applies equally to the pitch and/or yaw vectors. The acceleration vector represents the sensed roll axis motion of the vehicle. Acceleration feedback is a more direct source of feedback than rate or attitude feedback since it represents instantaneous vehicle motion. The speed of reception of a feedback signal is of particular significance when dealing with a vehicle such as a helicopter having a bearingless main rotor. Such helicopters need a faster feedback mechanism to maintain a stable flight path because they generate higher frequency destabilizing forces. Inherent time integration delays in the generation of sensed data limits the performance of rate feedback and attitude feedback systems for compensating for BMR induced oscillations.

Automatic flight control systems (AFCS) are suitably used in conjunction with the present inventive system shown in FIG. 1 as system 10. The AFCS may be a plug-in card or a software algorithm stored in memory in system 10.

The AFCS receives a multitude of sensed data. Among these parameters are angular acceleration, airspeed, angular rate, attitude, heading, longitudinal groundspeed and lateral ground speed. The PFCS also receives limited sensed data such as airspeed, cockpit control inputs and yaw rate. Since the acceleration vector is already being sensed by the vehicle sensors (i.e. accelerometers) it is efficient to utilize the acceleration vector to facilitate the generation of a compensation force to be used in conjunction with pilot stick command input thereby creating a corrective signal for reducing the effects of destabilization forces on the vehicle.

The system shown in FIGS. 1–3 controls a swashplate such that destabilization forces, such as oscillations, in a vehicle approach a nullity.

FIG. 1 shows a model-following control system 10 with acceleration feedback about the X-axis (roll axis). Although FIG. 1 shows acceleration feedback in the roll axis, this system also applies equally to acceleration feedback about the Y-axis (pitch) and Z-axis (yaw).

As shown in FIG. 1, model-following control system 10 consists of vehicle dynamics inputs 190, an attitude vector circuit 110, a rate vector circuit 130, mixing circuit 148 and servo 150 (150 denotes a single servo, but the vehicle typically utilizes a plurality of servos), an acceleration vector circuit 180 and summation circuits (also referred to as summers herein) 158 and 160. Each of these will be described in further detail below. The attitude vector circuit 110, rate vector circuit 130, servo 150 and acceleration vector circuit 180 are coupled to the vehicle dynamics 190.

Vehicle Dynamics

Vehicle dynamics 190 is sensed data generated from a vehicle. The vehicle dynamics 190 provide input to the attitude vector circuit 110, via interconnector 116; input to rate vector circuit 130, via interconnector 152; and input to acceleration vector circuit 180, via interconnector 188. The vehicle dynamics 190 receive output from the servo 150. The vehicle dynamics 190 include sensors to detect flight path parameters. Specifically, the sensors on the vehicle include accelerometers 191. Accelerometers 191(a), (b) and (c) represent three independent accelerometers for redundancy purposes, but any suitable number could be employed. The accelerometers 191 could be linear or angular accelerometers, gyroscopes, or any device capable of outputting an acceleration vector signal representing sensed vehicle motion. Accelerometers 191(a)(b) and (c) are suitably used to gather sensed oscillatory data related to destabilizing forces exerted on the vehicle. These forces could be oscillations produced by the rotor, crosswinds, turbulence, cargo or passenger movement within the vehicle, and the like. Examples of possible locations of the accelerometers 191(a)(b) and (c) include at either fuselage side in the electronics bay, below the pilot's and/or co-pilot's seat or below the rotor hub. The quantity, type and location of the accelerometers used is not critical to understanding the invention and is substantially a design choice.

Vehicle dynamics 190 also receive as an input, the output from the servo 150, via interconnector 170. This output from the servo 150 includes signals that are suited to control an adjustable surface (not shown) of the vehicle. In the case in which the vehicle is a helicopter, the adjustable surface is a swashplate that is adjusted by the servo. The swashplate is used to control the pitch of the rotor blades of the helicopter. In the case in which the vehicle is a fixed wing aircraft, the adjustable surface is suitably a portion of the wing that can be controlled by the servo.

Attitude Vector Circuit

Attitude vector circuit 110 includes an attitude model circuit 112, a summation circuit 118 and a feedback shaping circuit 114. Attitude vector circuit 110 receives input from the rate vector circuit 130, via interconnector 136(b) and input from vehicle dynamics 190 via interconnector 116, and provides an attitude error signal via interconnect 154 to summation circuit 160.

The attitude model circuit 112 receives input, via interconnector 136(b), from the rate vector circuit 130. This input 136(b) corresponds to a command signal from the cockpit, represented by lateral pilot stick command 125. The input via 136(b) is suitably the result of a manual adjustment to a controller, or an automatic flight control input or a combination thereof. The rate vector circuit 130 may process the command signal from the cockpit prior to transmitting the command signal to attitude model circuit 112. The attitude model circuit 112 has the function of processing the input to generate a desired attitude vector. Attitude model circuit 112 outputs an attitude signal to summation circuit 118 via interconnection means, such as a wire, 120. Attitude model circuit 112 is typically axis transformation and integration circuits. Axis transformation is geometric transformation from body X, Y, Z axes to earth referenced Φ, Θ, Ψ axes.

The summation circuit 118 also receives as input, sensed attitude data, which represents a response by the vehicle to control input and forces exerted on the vehicle. This sensed attitude data (or attitude feedback data) is transmitted from vehicle dynamics 190, via interconnector 116, to summation circuit 118. The summation circuit 118 sums the output from the attitude model circuit 112 and the attitude feedback data from interconnector 116 and outputs an attitude error signal, via interconnector 122, to feedback shaping circuit 114.

The feedback shaping circuit 114 receives the attitude error signal and processes the signal based on pre-programmed logic. Feedback circuit 114 is typically axis transformation (earth to body) circuits, and proportional and integral gain circuits. Feedback shaping circuit 114 has two outputs shown as lines 154 and 156. The attitude vector circuit 110 outputs signals via interconnectors 154 and 156 that reflect the attitude of the vehicle dynamics 190.

Rate Vector Circuit

The rate vector circuit 130 outputs a composite output signal to the servo 150. The rate vector circuit 130 also outputs a rate command signal via interconnector 136 (b) to attitude vector circuit 110 and an acceleration command signal via interconnector 146 to the acceleration vector circuit 180. Both these command signals are representative of pilot commands received from pilot lateral stick command 125. Rate vector circuit 130 also includes an inverse plant model circuit 135, summation circuit 161, amplifier 162, integrator unit 140 and limiting function units 155 and 157.

Lateral pilot stick command 125 generates a lateral pilot command signal based on pilot action. This lateral pilot command signal, transmitted via interconnect 127, is processed by the command signal circuit 132 to generate command signals based on the pilot input. These command signals include: rate command signals; acceleration command signals; and attitude command signals. The rate command signal is transmitted to summation circuit 161 and to attitude model circuit 112 via lines 136(a) and (b) respectively. The command signal circuit 132 also outputs an acceleration command signal, via interconnect 146, to the accelerator vector circuit 180. The command signal circuit 132 has memory that stores commands. The inverse plant model circuit 135 is used to generate servo commands from the rate command signal for the swashplate (not shown). This swashplate input signal represents an inverse, first order transfer function approximation that is designed to cancel the inherent on-axis dynamics of the vehicle and incorporate the desired on-axis response characteristic. This facilitates a pilot commanded flight path.

In addition to receiving a rate command signal via interconnection 136(a) summation circuit 161 also receives a rate feedback signal from vehicle dynamics 190 via interconnector 152. This rate feedback signal reflects the rate vector sensed by the vehicle dynamics 190. Summation circuit 161 combines the rate command signal input via interconnector 136(a) and rate feedback signal received via interconnector 152 and outputs a rate error signal that represents the difference of the rate command signal and the rate sensed by the vehicle. This rate error signal is transmitted, via interconnector 172, to amplifier 162.

Amplifier unit 162 amplifies the rate error signal by a prespecified gain such as for example, three inches/radian/sec and outputs the amplified rate error signal to summation circuit 158 via interconnector 164. Summation circuit 158 receives a second input from the inverse plant model circuit 135, via interconnector 138, and a third input from the integrator unit 140 via interconnect 142. The integrator unit 140 is used to maintain a desired trim swashplate position without the need for constant displacement of the lateral pilot command stick 125. The inverse plant model 135 transmits a feedforward signal related to the movement of the stick 125 to summation circuit 158, via interconnect 138. The feedforward signal represents an estimate of the rotor command required to produce the commanded roll rate.

Integrator unit 140 receives input from limiting function circuit 157, via interconnector 144, which prevents a signal from exceeding a certain specified magnitude or dropping below a certain value thereby providing authority limits. This limit controls the rate of the output of the integrator unit 140. Summation circuit 158 provides the resulting signal to summation circuit 160 via interconnector 159. Summation circuit 160 receives two additional inputs, one from limiting function circuit 155 via interconnector 174, and the second from an amplifier 184 via interconnector 186.

Summation circuit 160 produces a composite output signal that is received by mixing circuit 148 via interconnector 166. This composite output signal is used by the mixing circuit 148 to adjust the servo 150 position so that the effects of destabilizing oscillations are reduced.

Mixing Circuit and Servo-Actuator

The mixing circuit 148 minimizes off-axis responses by tailoring the output received to obtain a desired response. Mixing circuit 148 outputs a signal to servo-actuator (known as a servo or actuator) 150 via interconnector 168. The servo 150 outputs an actuating signal via interconnector 170 to the vehicle dynamics 190. The servo 150 is suitably arranged to control the blades of a helicopter or otherwise adjust the pitch of an adjustable surface. The servo, or actuator, 150 is typically attached to a swashplate (not shown) in helicopter applications or attached to a portion of the wing of a fixed-wing airplane. In either the helicopter or fixed-wing embodiments, the servo acts on, or in combination with, control system apparatus. Examples of such apparatus include swashplates and airfoils. The servo 150 is suitably a hydraulically powered servo actuator in helicopter applications.

Acceleration Vector Circuit

The acceleration vector circuit 180 receives the acceleration command signal from the rate vector circuit 130 and an acceleration feedback signal from vehicle dynamics 190 and produces an amplified acceleration error signal that is output to summation circuit 160, via interconnector 186. The acceleration vector circuit 180 consists of a filter 182, an accumulation circuit 189, and an amplifier 184.

Filter 182 receives an acceleration feedback signal from vehicle dynamics 190 via interconnector 188. This signal from the vehicle dynamics 190 represents the motion of the aircraft sensed by the accelerometers 191 (a)(b) and (c). The filter 182 is preferably a low pass filter that filters the acceleration feedback signal such that only frequencies less than approximately 10 Hertz more, preferably less than 5 Hertz and most preferably less than approximately 3.5 Hertz are transmitted to accumulation circuit 189 via interconnector 187. Frequencies below 3.5 Hertz typically do not result in potential excitation of other rotor modes in a helicopter application since the main rotor progressive lag mode is about 10 Hertz. Specific rotor mode frequencies depend on the particular helicopter and the filter 182 may be adjusted accordingly.

Accumulation circuit 189 also receives a second input, via interconnector 146, from command signal circuit 132. This input is the acceleration command signal, which is indicative of the input from pilot lateral stick command 125. The accumulator 189 sums the low frequency signal from filter 182 and the acceleration command signal received from command signal circuit 132. Accumulator 189 outputs an acceleration error signal to amplifier 184 via interconnector 185. Amplifier 184 is preferably a gain amplifier that multiples the acceleration error signal by a predetermined gain factor between approximately 0.9 and 0.3 and typically 0.6. The acceleration error signal on interconnector 185 represents the difference between the commanded acceleration signal and the vehicle response. Amplifier 184 then outputs an amplified acceleration error signal via interconnector 186 to summation circuit 160. Summation circuit 160 sums the amplified acceleration error signal (186), composite rate signal (159) and attitude error signal (174) to produce a net feedback signal or composite output signal to mixing circuit 148 via interconnector 166.

FIG. 2 shows a second embodiment of an aircraft model-following control system 10 using acceleration feedback. This embodiment shows the vehicle dynamics 190 being generated from a helicopter. FIG. 2 shows feedback data transmitted, via interconnectors 188 and 152, from the vehicle dynamics 190 combined with feedforward signals transmitted via interconnector 216, to actuate the servo 150. The servo 150 is used to adjust a swashplate (not shown) of the vehicle.

The vehicle dynamics 190 contain one or more accelerometers (not shown in FIG. 2) to generate acceleration feedback data based on sensed motion of the helicopter. Vehicle dynamics 190 also include sensors (not shown) for generating other helicopter data. As stated previously, the quantity and location of the sensors and accelerometers is a design choice and is not critical to understanding the instant invention.

Sensed acceleration and motion of the helicopter is transmitted from the vehicle dynamics 190 to filter 182 via interconnection 188. The aircraft sensors, also transmit rate data to rate feedback summer 161 via interconnector 152.

FIG. 2 shows that the vehicle dynamics 190 provide rate and acceleration feedback data. Vehicle dynamics 190 are adjusted based on a rate error signal, an acceleration error signal and a composite feedforward command signal. For simplicity, an attitude error signal path is not shown. The generation of each of these signals will be described in the environment of FIG. 2. Although the system 10 is illustrated and described in terms of the roll axis, it is also suitably used for pitch and/or yaw axes.

Rate Error Signal

The rate error signal is transmitted from summation circuit 161 via interconnector 172, and is produced by summing a rate feedback signal from the vehicle, transmitted via interconnector 152 and rate command signal transmitted via interconnector 137. The rate error signal provides one component of a composite output signal.

Summation circuit 260 generates rate command signal by summing input 207 and input 142. Input 142 represents output from integrator circuit 143. Integrator circuit 143 receives a feedforward acceleration command signal input via connector 278 from multiplier 276. Feedforward acceleration command signal via interconnector 278 represents a processed signal that is based on input from the desired bandwidth circuit 280, the pilot lateral stick command 125 and the maximum allowable roll rate circuit 298, as well as input from feedback loops 202 and 262. The feedforward acceleration command is a feedforward signal since it has no feedback components from vehicle dynamics 190.

The desired bandwidth circuit 280 represents a preprogrammed parameter that system 10 performs. For example, the desired bandwidth is suitably logic control signals that define a particular aircraft response break frequency.

The pilot lateral stick command 125, as discussed previously, represents control motion from the operator in the cockpit of the aircraft combined with any automatic commands input into the aircraft controls.

The maximum roll rate command circuit 298 inputs a preprogrammed maximum roll rate capability of the aircraft that can be commanded by the pilot.

These inputs (bandwidth, maximum roll rate) are suitably programmed to meet desired specifications for optimal aircraft response characteristics. (For example, the maximum roll rate circuit 298 can be programmed to be 50° per second at a hover speed and 100° per second at a high speed such as 60 knots or more. The desired bandwidth can be programmed based on the desired aircraft agility and therefore influence the ultimate roll acceleration command.)

The stick command generated from pilot lateral stick command 125 is input to multiplier 292. Multiplier 292 also receives maximum roll rate command signal that has been multiplied by amplifier 296, via interconnector 294. (The amplifier 296 receives a maximum roll rate command via interconnector 297 from maximum roll rate command circuit 298.)

The output from multiplier 292, which represents the pilot's roll command scaled to degrees per second, is transmitted to summation circuit 264 via interconnector 204. Summation circuit 264 receives input via interconnector 262 from the output of integrator 243. The summation circuit 264 generates a resulting command signal based on the two inputs and transmits the resulting command signal to multiplier 268 via interconnector 266.

Multiplier 268 also receives input from amplifier 284 via interconnector 290. Amplifier 284 receives, via interconnector 286, a desired bandwidth signal as input from the desired bandwidth circuit 280. Multiplier 268 multiplies the amplified desired bandwidth signal and the resulting command signal and outputs the product to summation circuit 272 via interconnector 270.

Summation circuit 272 receives a second input via interconnector 202 that represents output from integrator 143. The summation circuit 272 sums the output from multiplier 268 and the feedback loop 202 and outputs a signal to multiplier 276 via interconnector 274. Multiplier 276 receives a second input via interconnector 288 that represents output from amplifier 282. Amplifier 282 receives the desired bandwidth signal from desired bandwidth circuit 280, via interconnector 286, and transmits the amplified signal to multiplier 276 via interconnector 288. Multiplier 276 multiplies the inputs to produce a feedforward acceleration command signal that is transmitted to integrator 143 via interconnector 278. This feedforward acceleration command signal represents the result of processing signals received from pilot lateral stick command 125, maximum roll rate command circuit 298 and desired bandwidth circuit 280.

The feedforward acceleration command signal is also transmitted to summation circuit 226 and accumulation circuit 189 via interconnectors 230 and 146 respectively. The use of the feedforward acceleration command signal in the summation circuit 226 and accumulation circuit 189 will be discussed later.

The output from integrator circuit 143, which is an integrated feedforward acceleration command signal, is used as input to four other locations in system 10 as shown in FIG. 2. The first output location for integrator 143 is to multipliers 244 and 245. The second output location for the integrated feedforward acceleration command signal is summation circuit 260 via interconnector 142. The third output location for integrated feedforward acceleration command signal is integrator circuit 243 via interconnector 205. The fourth output location for feedforward acceleration command signal is summation circuit 272 via feedback loop 202.

Integrator 243 further integrates the integrated feedforward acceleration command signal received from integrator 143. The twice integrated signal output from integrator 243 is used as a feedback signal to summation circuit 264, via feedback loop 262. The twice integrated signal is also input to multiplier 258. via interconnector 206. Multiplier 258 also receives input from the trim break frequency circuit 299 via interconnector 295. Trim break frequency circuit 299 outputs a preprogrammed signal indicative of a trim follow-up break frequency. Trim break frequency circuit 299 operates in conjunction with the maximum roll rate command circuit 298 desired bandwidth circuit 280 and pilot lateral stick command 125 to filter the pilot roll commands.

This trim break frequency signal, transmitted via interconnector 295, is input into multiplier 258 which outputs the product of input from integrator 243 and trim break frequency circuit 299 to summation circuit 260 via interconnector 207. Summation circuit 260 then sums the signals input via interconnector 207 and the integrated feedforward acceleration command signal received via interconnector 142 and outputs a rate command signal to rate feedback summation circuit 161 via interconnector 137. Rate feedback summation circuit 161 sums the difference between the rate command signal from summation circuit 260 and the rate feedback signal received from vehicle dynamics 190 via interconnector 152. The rate feedback summation circuit 161 then outputs a rate error signal to amplifier 162 via interconnector 172. The rate error signal represents the difference between the pilot commanded roll rate and the roll rate experienced by the vehicle dynamics 190.

Acceleration Error Signal

The acceleration error signal represents the difference between the roll acceleration response of the vehicle and the vehicle command. The error signal is used for compensation to stabilize undesired roll oscillations of the vehicle. The acceleration error signal is generated by accumulation circuit 189. Accumulation circuit 189 receives input 146 that represents the feedforward acceleration command signal from the output of multiplier circuit 276 and a second input from filter 182. Filter 182 receives acceleration feedback signals from vehicle dynamics 190, via interconnector 188, and transmits the filtered signal to accumulation circuit 189 via interconnect 187. Filter 182 is preferably a low pass filter that filters out all signals that exceed approximately 5 Hertz and more preferably signals that exceed approximately 3.5 Hertz. This low pass filtering is particularly useful when the vehicle is a helicopter because the filtering removes signals that may potentially excite resonant modes in the helicopter in the closed loop system.

Accumulation circuit 189 sums these signals and outputs the resulting acceleration error signal to gain amplifier 184 via interconnector 185. Gain amplifier 184 then multiplies the acceleration error signal by a predetermined gain typically between 0.9 and 0.3 and preferably approximately 0.6 and outputs an error compensation signal, which represents the amount of compensation necessary to cancel the undesired roll motion of the vehicle. This compensation signal is a function of the generated acceleration error signal. The compensation signal is transmitted to summation circuit 160 via interconnector 186. Summation circuit 160 also receives as input, the rate error signal that is output of the rate feedback summation circuit 161 via interconnector 164. The rate error signal is suitably amplified by amplifier 162 to produce an amplified rate error signal. The summation circuit 160 sums the compensation signal and the amplified output from the rate feedback summation circuit 161 to produce a composite output signal that is transmitted to summation circuit 218 via interconnector 166.

Composite Feedforward Command Signal

Summation circuit 218 receives two inputs, the first is from multiplier 214 via interconnector 216 and is a composite feedforward command signal. This composite feedforward command signal is generated in feedforward command circuit 20. This feedforward command circuit 20, is suitably coupled to acceleration vector circuit 180 of FIG. 1. Although this configuration is not shown, those skilled in the art will appreciate that the composite feedforward command signal generated by circuit 20 can be used in conjunction with FIG. 1 and the other embodiments disclosed herein. The second input to summation circuit 218 is the composite output signal from summation circuit 160 via interconnector 166.

The composite feedforward command signal input to summation circuit 218 is comprised of four components. The first component is the feedforward acceleration command signal transmitted via interconnector 230 that is output from multiplier 276. This component of the composite feedforward command signal is summed at summation circuit 226 with the second component of the composite feedforward acceleration command signal, which is output from summation circuit 238 that is transmitted to summation circuit 226 via interconnector 232.

Summation circuit 238 generates the second component by summing two inputs 246 and 248. The first input, via interconnector 248, is the result of the output from integrator circuit 143, via interconnector 256, that has been multiplied by the output from roll stability derivative circuit 250. Multiplier circuit 245 receives input via interconnector 256 from integrator 143 and also receives input via interconnector 254 from the roll stability derivative circuit 250. The roll stability derivative circuit 250 provides an input parameter that is similar to the input from trim break frequency 299, desired bandwidth circuit 280 and maximum roll rate command circuit 298. This roll stability derivative circuit 250 provides data related to characteristics of a helicopter's inherent roll axis dynamic response. This data is suitably preprogrammed logic signals to model the roll rate response characteristics and thereby form an inverse model of the vehicle's roll axis dynamic response. The multiplying circuit 245 multiplies the input received from the roll stability derivative circuit 250 with the output from integrator circuit 143 thereby creating a resulting signal that is inputted to summation circuit 238 via interconnector 248.

Summation circuit 238 receives the second input, via interconnector 246, from multiplier 244 which multiplies the output from integrator 143 with the output from trim break frequency circuit 240. The trim break frequency circuit 240 is similar to trim break frequency circuit 299 and provides an input to multiplier 244 via interconnector 242. Summation circuit 238 sums the two received signals 246 and 248 to output a resulting signal to summation circuit 226 via interconnector 232. The output from summation circuit 226 is input to summation circuit 222 via interconnector 228. Summation circuit 222 also receives input from multiplier 234 via interconnector 236.

The input received from multiplier 234 represents the third component of the composite feedforward command signal. Multiplier 234 multiplies the roll stability derivative circuit 250 output via interconnector 252 and the output from multiplier 258, which is input to multiplier 234 via interconnector 208.

The results of summing inputs 228 and 236 in summation circuit 222 is output to multiplier 214 via interconnector 224. Multiplier 214 multiplies the input from summation circuit 222 by the fourth component of the composite feedforward command signal, which is an inverse control derivative circuit 210 output, which is received by multiplier 214 via interconnector 212. The composite feedforward command signal, which represents the approximate control command needed to generate the pilot commanded roll rate, is output to summation circuit 218 via interconnector 216.

Summation circuit 218 sums the composite feedforward acceleration command signal received via interconnector 216 with the composite output signal received via interconnector 166. The result of this summation is a corrective command signal transmitted to mixing circuit 148 via interconnector 220. The mixing circuit 148 commands displacement of servo 150 and linkages (not shown) to control the tip path plane of the main rotor (not shown) of vehicle dynamics 190. Interconnector 170 provides an input path for the commands to control the main rotor of vehicle dynamics 190. The corrective command signal represents the rate error component, acceleration error component and the composite feedforward command component. In this way, the system 10 utilizes the model-following control laws to command the vehicle responses.

FIG. 3 is a schematic illustration of a third embodiment of the present invention. This embodiment shows model-following control system 30 with a main memory bank. FIG. 3 shows a main memory bank 333, which performs the required execution of software and preprogrammed logic and is suitably a microcomputer or one or more microprocessors. The algorithms and/or software for performing the required signal processing are stored in main memory databank 333. Also, the PFCS and AFCS cards (not shown) may be plugged into main memory bank 333. Main memory databank 333 is coupled to a flight control data bus 344, swashplate 378, sidearm cockpit controls 328 and 330, and the collective pitch controls shown as 125(a) and (b).

The main memory databank 333 includes flight control computer 332, backup computer 334 and summation circuit 336. Flight control computer 332 is suitably an 80486 processor however, any processor with sufficient memory could be used. The flight control data bus 344 is coupled to various peripheral systems of the vehicle. Examples of these peripheral systems include inertial sensors 356, (a plurality of sensors are denoted by numeral 356) such as accelerometers, multipurpose display 358, mission equipment package 360, engine control unit 352, data system 348 and engine control units 346. FIG. 3 shows that additional sensors shown as number 354, which can be used for sensing rate and attitude data and flux valve and/or yaw rate are suitably coupled to the inertial sensors 356. These peripheral systems 346, 348, 353, 354, 356, 358 are interfaced with the flight control computer 332 and the backup computer 334.

Computers 332 and 334 also receive input from the weight on the wheels sensor 362 via wire 361 (although shown as a plurality in FIG. 3, multiple wires are described as a single wire for discussion purposes) and sends signals to the fantail servo 366, which controls fantail rotor control 368, via interconnector 363. Also, hydraulic system 370 sends status inputs to the flight control computer 332 via interconnector 369. The flight control computer 332 also receives input such as the main rotor RPM sensor 304 via interconnect 305, air data system 302 via interconnect 301, and cross-channel data link input 338. Additionally, the control signals from collective control sticks 125(a) and (b), side arm controllers 328 and 330 and various other cockpit systems shown as 306, 307, 308 and 309 are also received by main memory bank 333. Interconnection wire sets 310, 312, 314, 316, 318, 320, 322, 324 and 326 provide a mechanism for the various cockpit controls to input data to main memory databank 333. The flight control computer 332 also outputs signals to the main rotor swashplate 378 via servos 150(a), (b) and (c) through wire sets 371, 373 and 375 respectively. The main memory databank 333 also outputs signals to back-up engine control 340 via wires 342.

An acceleration feedback signal is generated by one or more inertial sensors 356, typically accelerometers that are attached to the flight control data bus 344 of the vehicle. These accelerometers are suitably placed on either side of the electronics bay, which is below the co-pilot seat and/or below the rotor hub. The placement of these accelerometers is not critical and is a design choice. The inertial sensors 356 detect the roll acceleration, which is a rotation about the x-axis of the vehicle. The roll acceleration signal is available on the data bus 344 which is suitably a 1553 standard data bus or, in the alternative, could be a digital data bus or, yet still, an analog hard wire input to the flight control computer which would then necessitate an analog to digital converter to convert the analog signals to a digital signal.

Flight control computer 332 includes a plurality of micro processors or CPUs and utilizes the inputs from the cockpit controls 125, 328, 306, 307, 308, 309 and the flight control data bus 344 to actuate and control swashplate 378 using the model-following software and/or logic commands stored in main memory bank 333. Software resident in flight control computer 332 converts the received sensed data from bus 344 to a format that can be utilized by the software. The flight control computer 332 processes the sensed data and the command data received from the cockpit to generate command signals. The flight control computer 332 transmits the command signals to the servos 150(a)(b) and (c), which are symmetrically disposed around a circular swashplate 378. This permits precise movement of the swashplate 378 in response to commands from computer 332.

Figure 4:
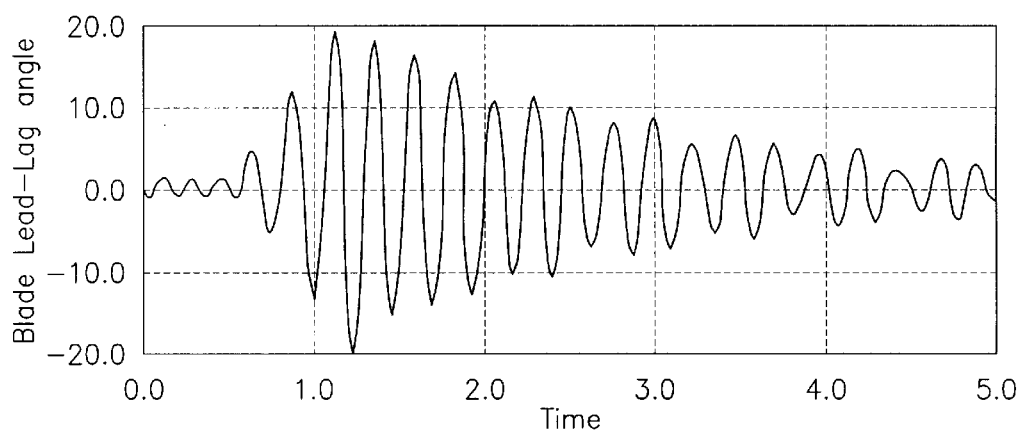
FIGS. 4–7 are graphical representations of the effects of the instant invention.

FIG. 4 shows a graphical representation of a helicopter main rotor blade lead-lag response to an input signal generated by a pilot stick command. The motion of the stick, which simulates a command from the pilot, generates an oscillation due to rotor system resonance. The exact stick input is a rapid forward then rearward longitudinal control reversal. As can be seen in FIG. 4, the stick input results in a lead-lag motion of the rotor blades with a peak magnitude of approximately 20 degrees that takes approximately 4 seconds to dampen.

As known to those skilled in the art, the implementation of a feedback system can adversely destabilize a system.

However, the instant feedback system, by filtering possibly destabilizing oscillations, enables the vehicle to have improved flight path stability.

Figure 5:
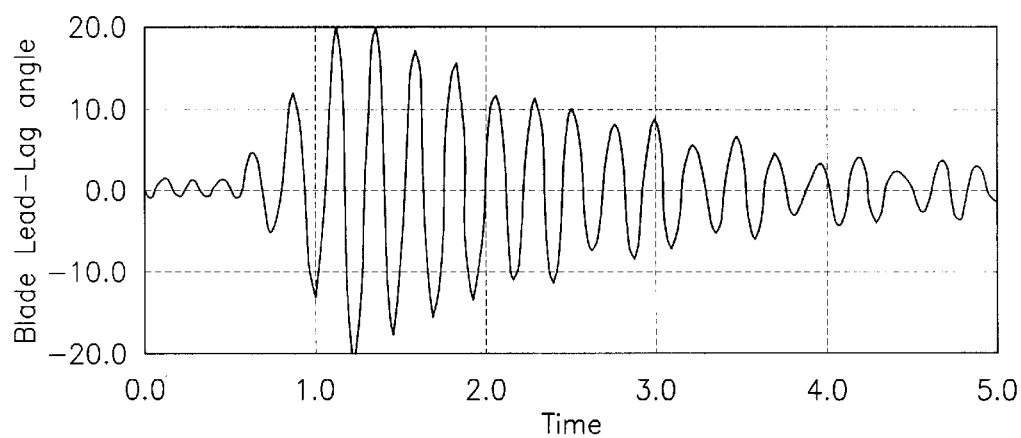

FIG. 5 shows a graphical representation of a helicopter rotor blade lead-lag response to an input signal generated by a stick command. FIG. 5 is similar to FIG. 4 in that the oscillation was generated by stick command signal. The difference between FIG. 4 and FIG. 5 is that FIG. 5 shows the graphical representation in a system that has an active control system such as the AFCS system with the acceleration feedback circuit, as described previously. As can be seen from a comparison of FIG. 4 and FIG. 5, the present invention does not destabilize the rotor system resonance.

Figure 6:
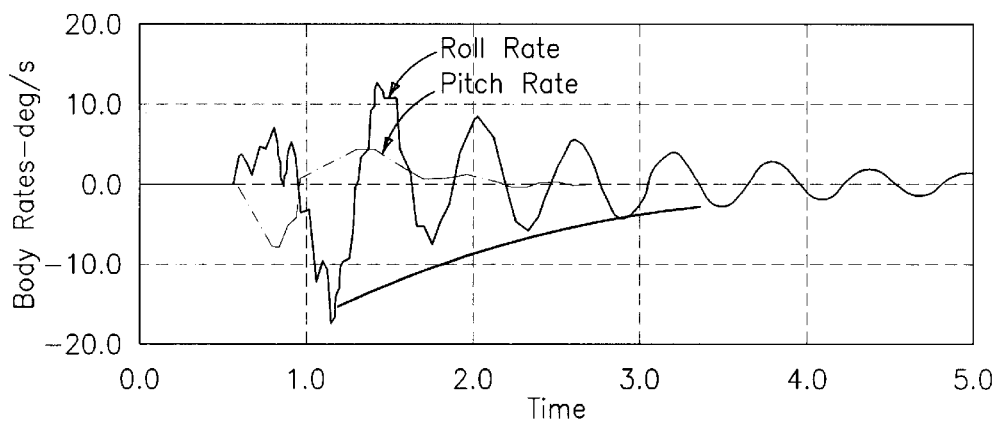

FIG. 6 is a graphical representation of the vehicle roll rate and pitch rate responses to an input signal that generated the rotor oscillations graphed in FIG. 4. FIG. 6 shows that the roll rate has a maximum amplitude in excess of 10 deg/second. The pitch rate has a maximum amplitude of approximately 3 deg/second. The damping ratio of the roll rate response is approximately 5½ percent. (This damping ratio represents the time that it takes to drive the roll rate to a substantially zero or null value.)

Figure 7:
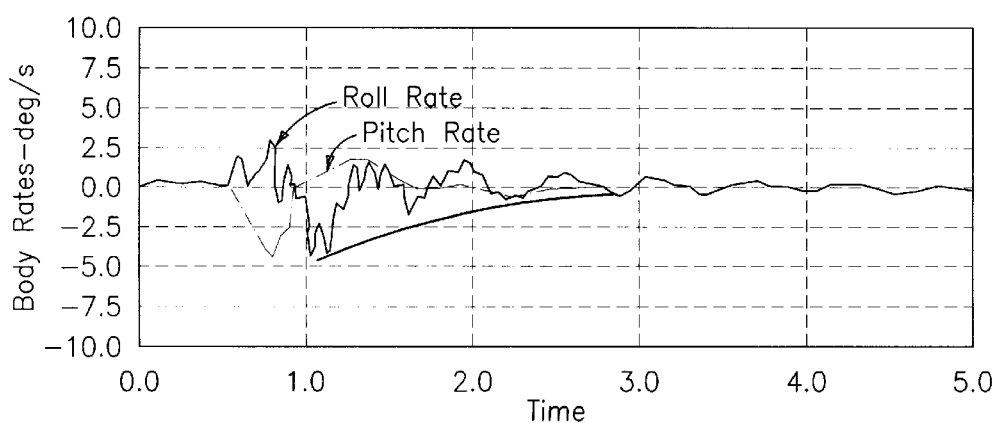

FIG. 7 shows a graphical representation of the vehicle roll ratio data and pitch rate response data, in degrees per second along the time axis. FIG. 7 shows the advantages using the instant invention of model-following roll acceleration feedback. As indicated between a comparison of FIGS. 6 and 7, the maximum roll rate in FIG. 7 is approximately 2.5 deg/second and the maximum pitch rate is approximately 3.0 deg/second. The damping ratio of the roll rate response is 7.2 percent. This means that there is approximately 30 percent improvement in the damping ratio with the acceleration feedback signal present. This means that any oscillations are driven to zero more rapidly with the present invention than without. Also, the amplitudes of the roll and pitch rates are substantially reduced using the instant invention when compared to a system without the instant invention.

Figure 8:
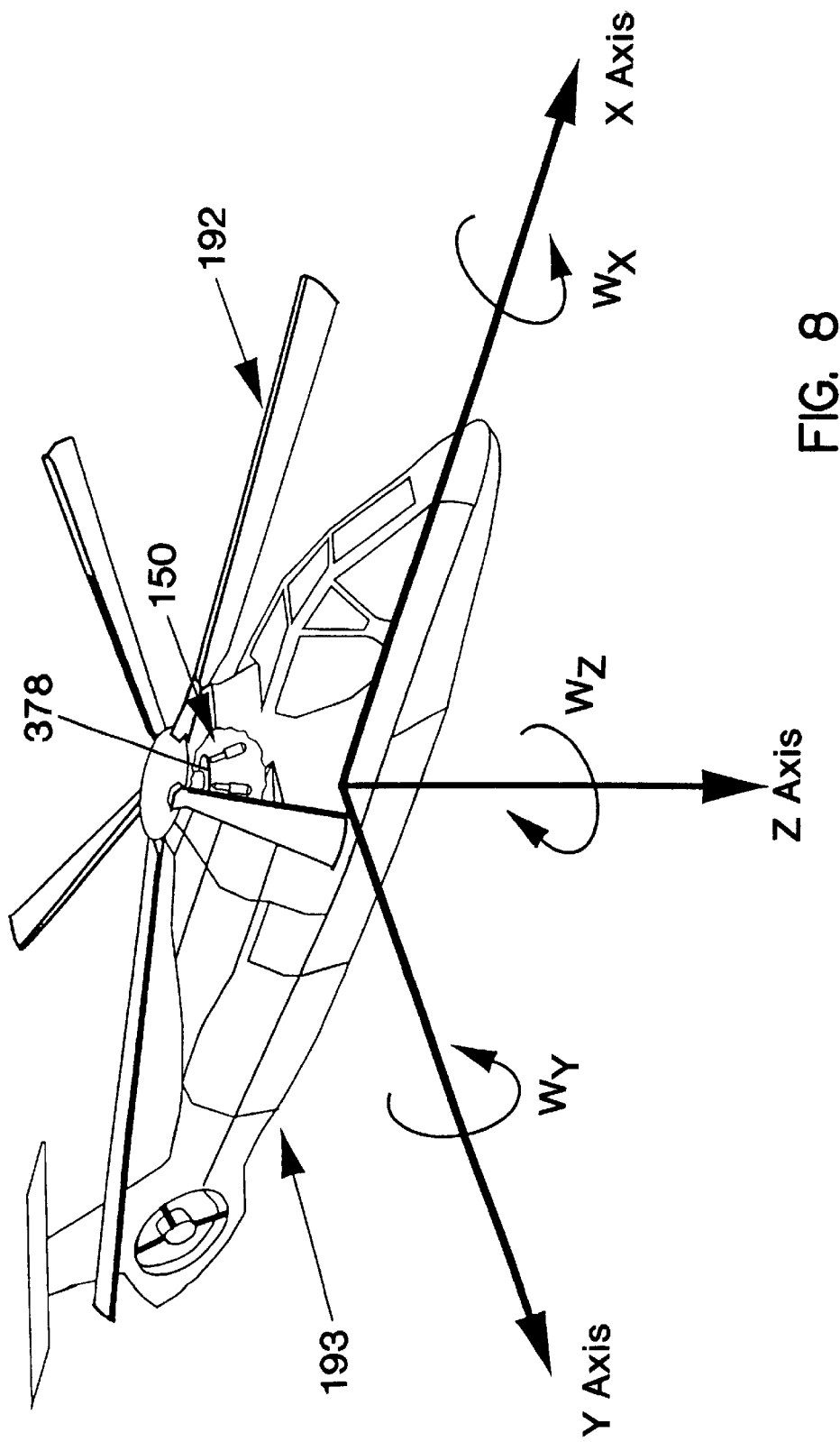
FIG. 8 shows a helicopter with a vector coordinate plane.

FIG. 8 shows orthogonal vector axes superimposed on a helicopter 193 with blades 192. Accelerometers (not shown) are used to measure the angular acceleration of the aircraft 193 about its center of rotation by measuring the angular acceleration ($W_x$, $W_y$, $W_z$) about each of the three orthogonal axes (X, Y and Z). The required motion of servos 150, which control swashplate 378, to stabilize the vehicle can be computed. The desired outcome is for the vehicle angular acceleration to equal the commanded acceleration.

The utilization of the model-following structure results in greater stabilization than a conventional feedback approach, because the acceleration error signal only incorporates the undesired response not commanded by the pilot.

Figure 9A:
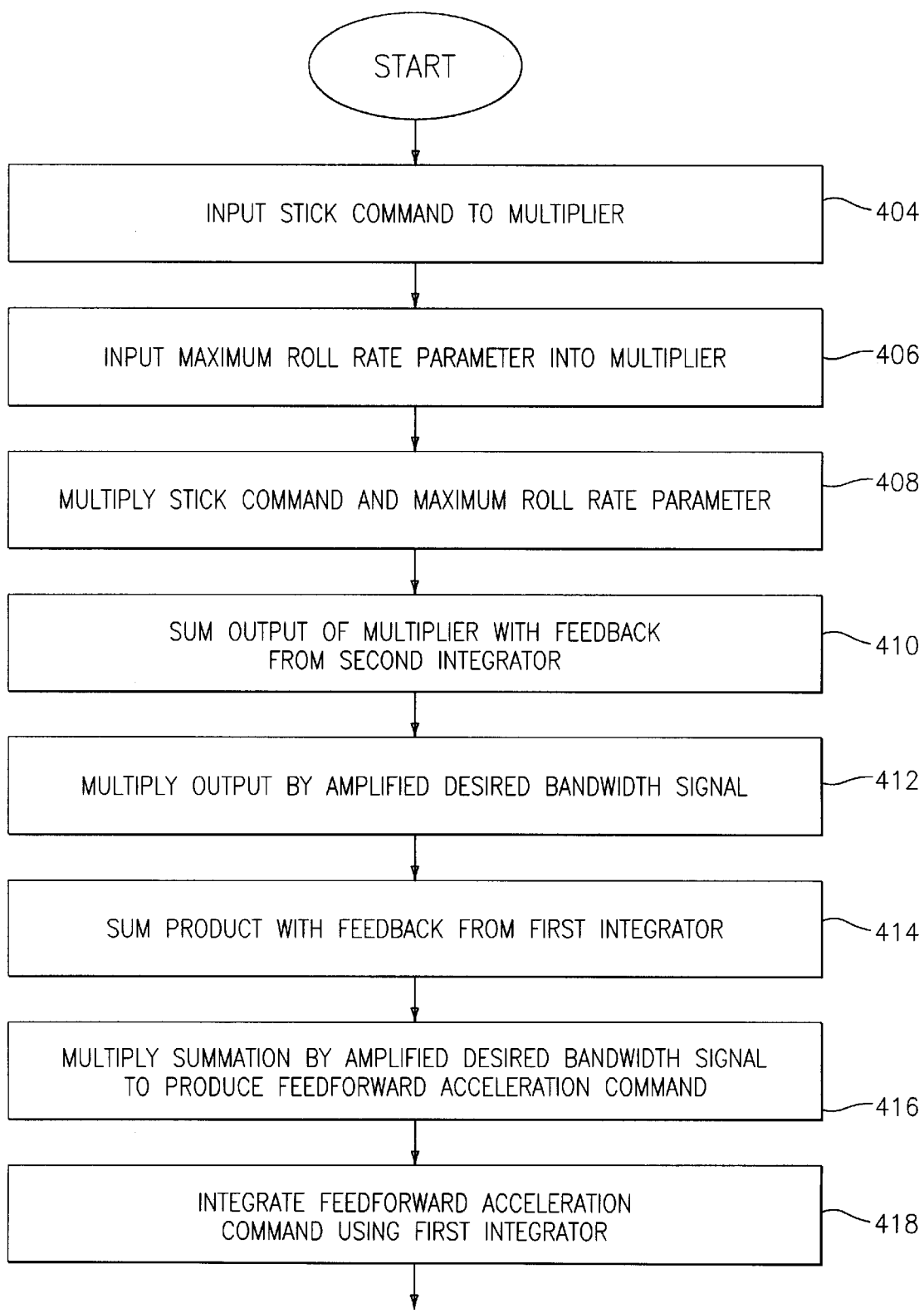
FIGS. 9A and 9B show a flowchart for generating a rate error signal.
Figure 9B:
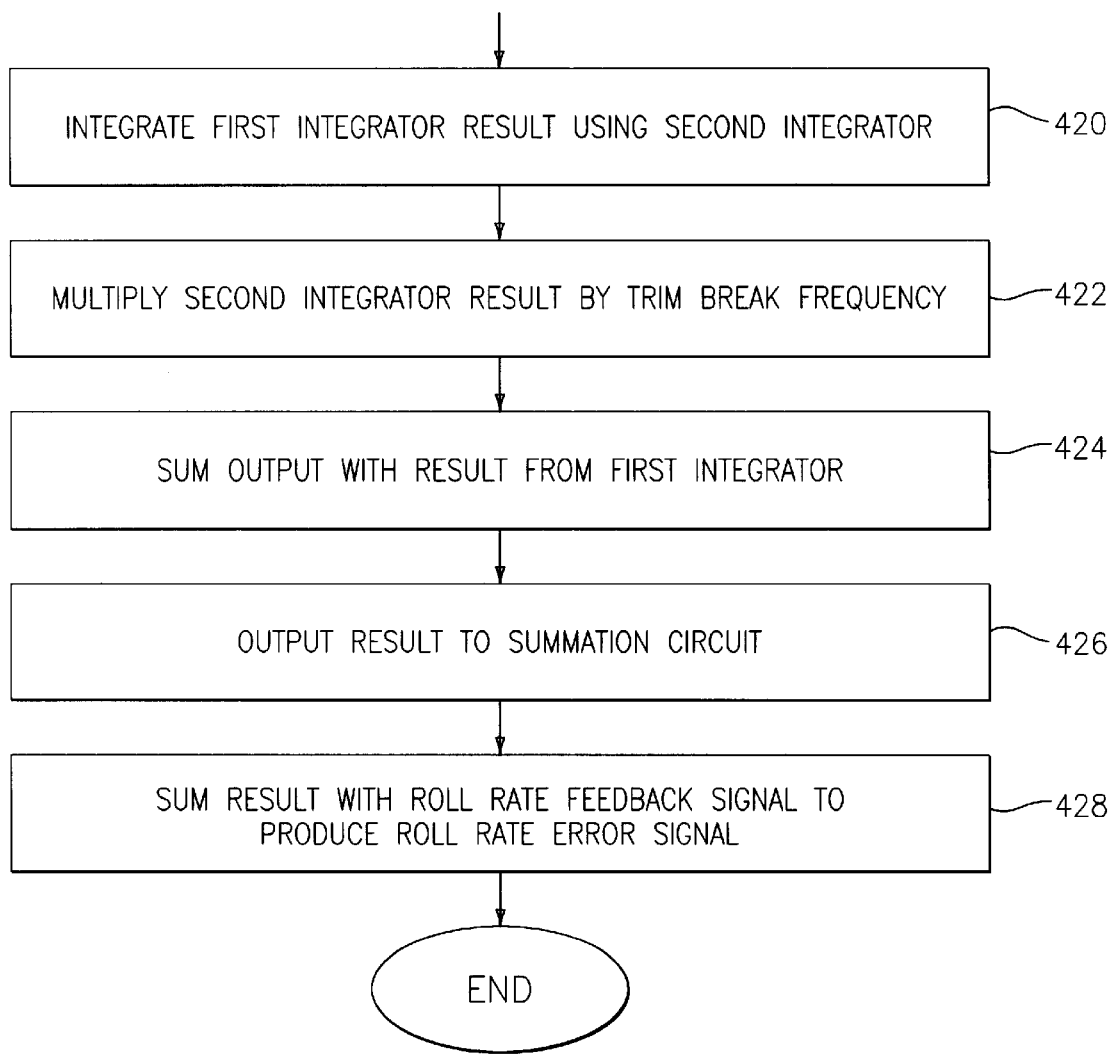

FIGS. 9A and 9B show a flow chart for the generation of a roll rate command signal. The generation of this signal is suitably a result of a series of software commands or alternatively hard wired electrical components. Regardless of the method for generating this signal, the steps are shown in FIGS. 9A and 9B.

In step 404, a stick command is input to a multiplier, this stick command can be generated by pilot control motion and/or programmable automatic flight control system software or hardware. This stick command is then multiplied by a maximum roll rate parameter as shown in step 406. Step 408 shows that the stick command and the maximum roll rate parameter are multiplied. In step 410, the product is summed with the output from a second integrator that is received via a feedback loop. In step 412, this output is then multiplied by an amplified desired bandwidth signal. As stated previously, the desired bandwidth signal is a pre-programmed, or actively adjusted parameter that determines the frequency response characteristics of the aircraft. Step 414 shows that the product is summed with feedback from a first integrator that is received via a feedback loop. Step 416 shows that this summation is multiplied by an amplified desired bandwidth signal thereby producing a feedforward acceleration command. In step 418, the feedforward acceleration command is integrated using an integration device. The integrated signal is then integrated a second time using a second integration device, this is shown in step 420. Step 422 shows that the second integration signal is multiplied by a trim break frequency. As stated previously, the trim break frequency is a control parameter that can be stored in memory or can be actively adjusted. The output of this multiplication is then summed with the output from the first integrator, this is shown in step 424. Step 426 shows that the output of this operation is transmitted to a summation circuit and step 428 shows that the summation result is then summed a second time with roll rate feedback data sensed from vehicle dynamics, such as the sensors described previously, to produce a roll rate error signal. At this point, the roll rate error signal has been generated. Although not shown in FIG. 9b, it is apparent, based on the description shown in FIG. 2, that the roll rate error signal can be used as part of a net feedback signal.

Figure 10:
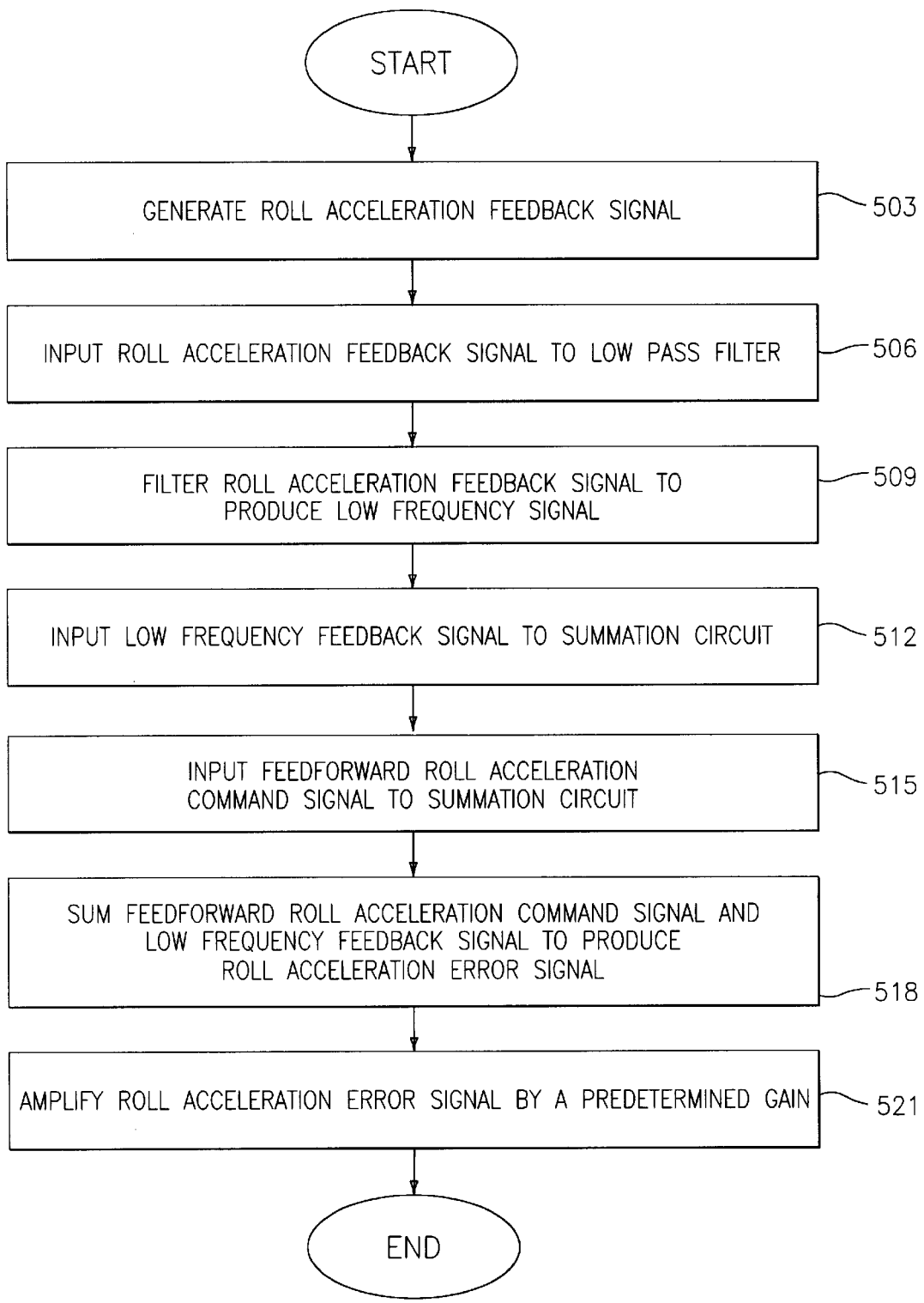
FIG. 10 shows a flow chart for generating an acceleration compensation signal.

FIG. 10 shows a flow chart for the series of steps, which are suitably employed for the application of software or hardware, for the generation of an error compensation signal. The error compensation signal is the result of summing an acceleration feedback signal with a feedforward command signal. The first step to generating the error compensation signal is to generate a roll acceleration feedback signal from the aircraft as shown in step 503. This feedback signal is input to a low pass filter to remove substantially all frequencies that exceed approximately 3.5 Hertz as shown in step 506. This low pass filtering of step 509, prevents any high frequency feedback signals from passing to the servo and generating an undesirable response. This low frequency signal is then input to a summation circuit as shown in step 512. The summation circuit also receives input of a feedforward roll acceleration command signal as shown in step 515. This feedforward roll acceleration command signal is the result of a pilot command signal from the control portion of the aircraft. As shown in step 518, the feedforward roll acceleration command signal and the low frequency feedback signal are summed to produce a roll acceleration error signal. This roll acceleration error signal represents the difference between what was commanded from the control system portion of the aircraft and the acceleration feedback received from the aircraft. This roll acceleration error signal is then amplified by a predetermined gain as shown in step 521. The gain is necessary to present a more useable acceleration error compensation signal. This acceleration error compensation signal, which is the result of amplifying the roll acceleration error signal, represents the amount of compensation necessary to cancel uncommanded roll oscillations. Although not shown in FIG. 10, it is apparent to one of ordinary skill in the art and shown in FIG. 2, that the error compensation signal can be summed with the rate error signal to produce a net feedback signal.

Figure 11A:
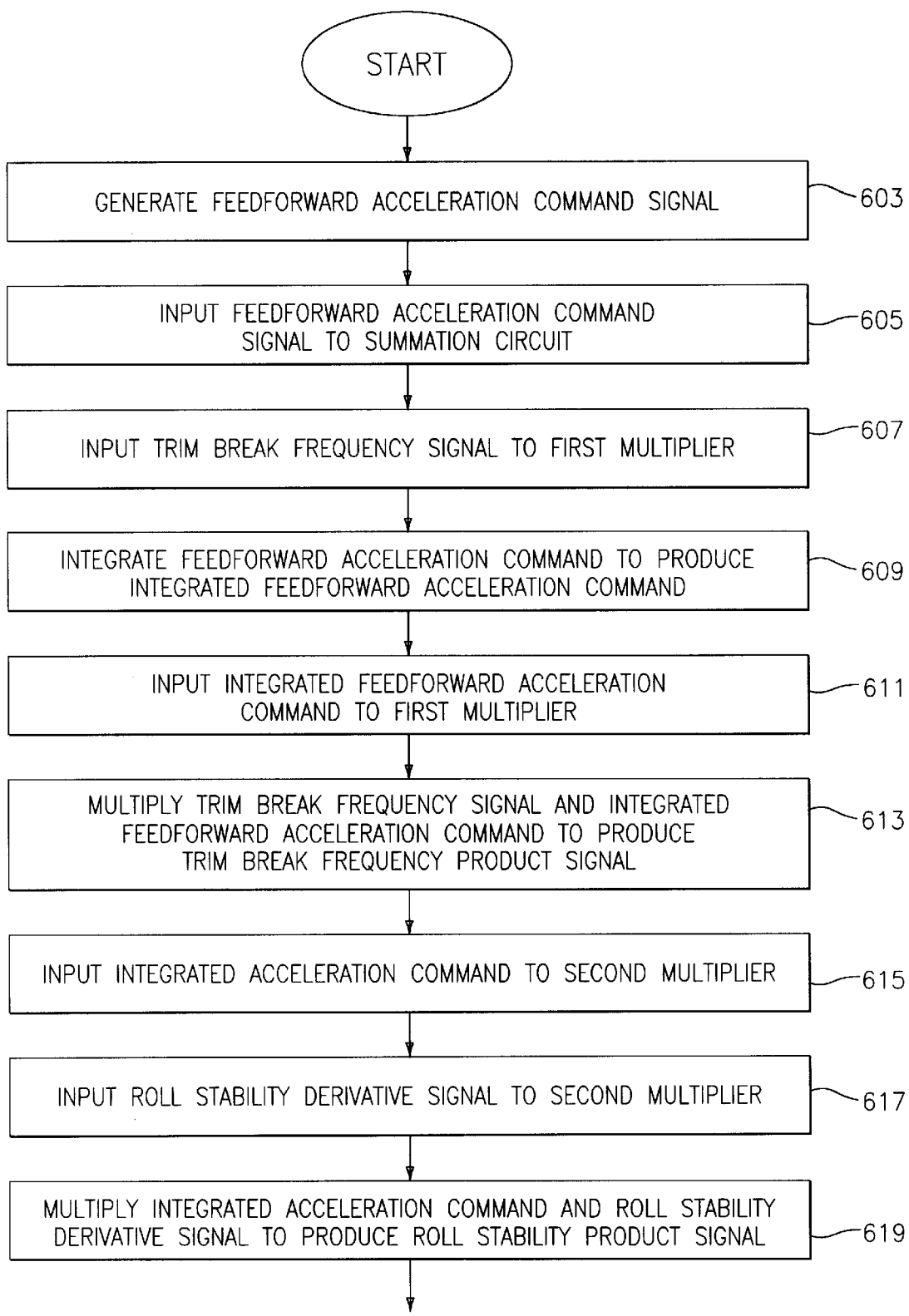
FIGS. 11A and 11B show a flowchart for generating a corrective signal. Like reference numbers and designations in the several views indicate like elements.
Figure 11B:
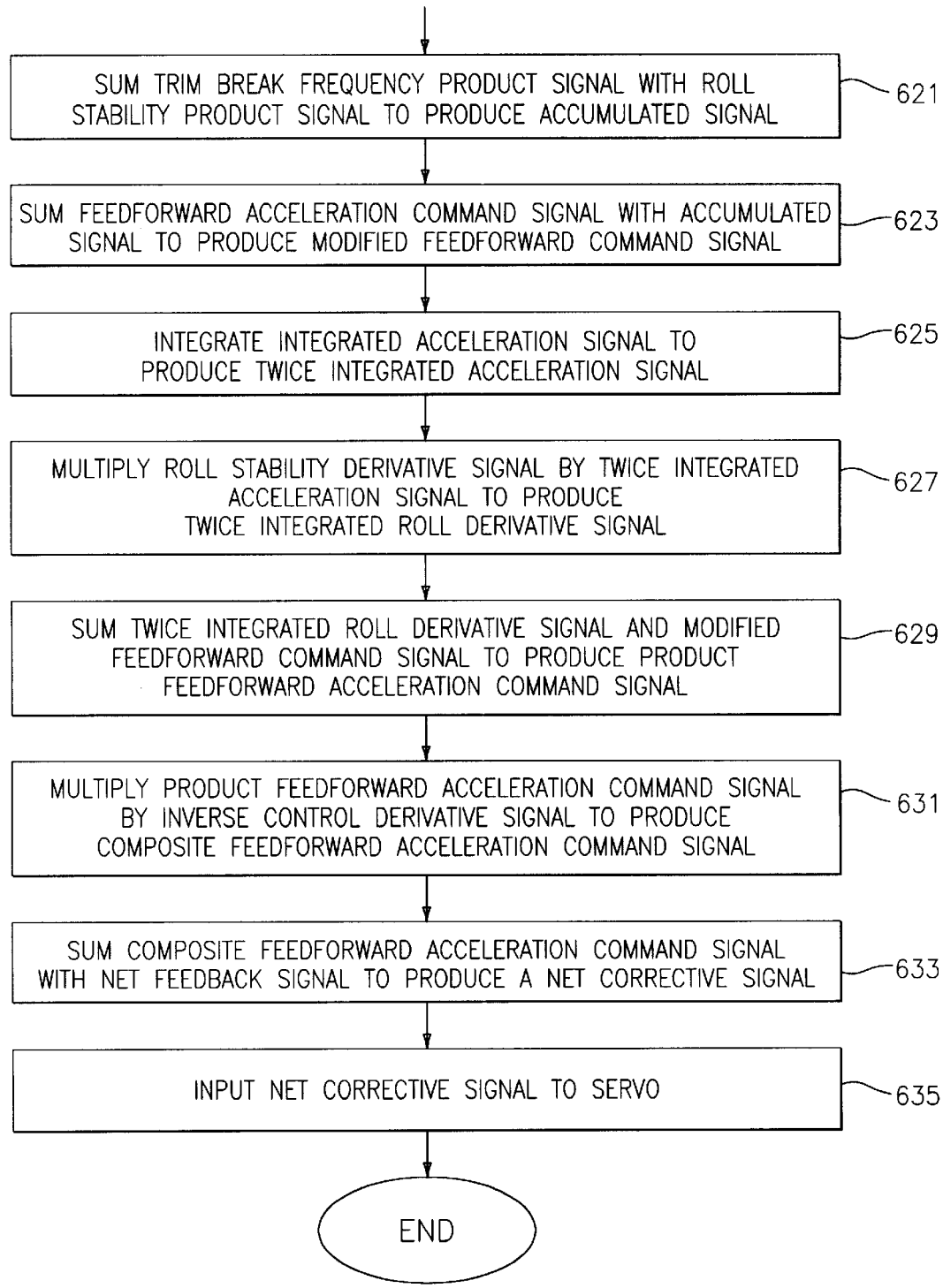

FIGS. 11A and 11B show a flow chart for the generation of a feedforward signal to control the servos. As shown in FIG. 11, a feedforward signal can be produced by first generating a feedforward acceleration command signal. This feedforward acceleration command is produced by the pilot from the control portion of the aircraft as shown in step 603. In step 605, the feedforward acceleration command is input to summation circuit. As shown in step 607, a trim break frequency signal is input into a first multiplier. The trim break frequency signal, as stated previously, represents a particular preprogrammed desired parameter. As shown in step 609, the feedforward acceleration command signal is integrated to produce an integrated feedforward acceleration command. As shown in step 611, this integrated feedforward acceleration command is input to the first multiplier. Step 613 shows that the integrated feedforward acceleration command signal and the trim break frequency signal are multiplied to produce a trim break frequency product signal. Step 615 shows that the integrated acceleration command signal is input to a second multiplier. Also, a roll stability derivative signal is input to the second multiplier as shown in step 617.

Step 619 shows that the integrated feedforward acceleration command signal and roll stability derivative signal are multiplied to produce a roll stability product signal. As shown in step 621, the trim break frequency product signal and the roll stability product signal are summed to produce an accumulated signal. This accumulated signal is then summed with the feedforward acceleration command to produce a modified feedforward command signal as shown in step 623.

As shown in step 625, the integrated acceleration signal is integrated a second time thereby producing a twice integrated acceleration signal. In step 627, the roll stability derivative signal is then multiplied by the twice integrated acceleration signal to produce a twice integrated roll derivative signal. The twice integrated roll derivative signal and the modified feedforward acceleration command signal are summed, thereby producing a product feedforward acceleration command signal as shown in step 629. As shown in step 631, this product feedforward acceleration command signal is multiplied by an inverse control derivative signal to produce a composite feedforward acceleration command signal. An inverse control derivative signal represents the amount of servo motion required to obtain the desired rate and acceleration response characteristic. In step 633, the composite feedforward acceleration command is summed with the net feedback signal to produce a corrective signal. The net feedback signal represents the sum of the acceleration error signal and the rate error signal. Combined, these feedback signals produce a net corrective signal, which is an intelligent response to the input control motion generated in the aircraft control section. The net corrective signal can then be provided to the servo to cause the servo to change position as shown in step 635.

It should be readily apparent that this system is also suitable for any vehicles that have an adjustable surface, including helicopters, fixed wing aircraft and flight simulation apparatus.

In an embodiment in which the system is used in a flight simulation apparatus, the acceleration error signal can be used to determine the flight path stability of the apparatus. In this embodiment, there is no actual servo or adjustable surface, but the flight simulation apparatus is capable of simulating surface responses to actuator position, which is a function of the acceleration error signal. Thus, the flight simulator, using software that can simulate vehicle data and responses, determines flight path stability. The flight simulation apparatus, using response data can provide data pertaining to the effectiveness of the system.

While the invention has been described above with reference to specific embodiments thereof, it is apparent that many changes, modifications and variations can be made herein. Accordingly, it is intended to embrace all such changes, modifications and variations that fall within the spirit and broad scope of the appended claims.

What is claimed is:

1. A system for controlling the effects of destabilizing forces comprising:

a vehicle having an adjustable actuator;

an accelerometer mounted on the vehicle for generating at least one acceleration feedback signal, the acceleration feedback signal being a function of vehicle motion;

a command signal circuit, coupled to the vehicle for receiving pilot command signals and producing command signals that are a function of the pilot command signals;

an accumulation circuit, coupled to the command signal circuit and the accelerometer for receiving a first command signal and at least one acceleration feedback signal and for summing the first command signal with at least one acceleration feedback signal thereby producing an acceleration error signal, that represents the difference between roll acceleration response of the vehicle and the pilot command signals;

an amplifier, having a predetermined gain, coupled to the accumulation circuit, for multiplying the acceleration error signal by the predetermined gain thereby producing an amplified acceleration error signal that represents the compensation necessary to cancel undesired roll motion of the vehicle;

a first summing circuit, coupled to the amplifier and to the command signal circuit for summing the amplified acceleration error signal from the amplifier with a second command signal that is output from the command signal circuit thereby producing a composite output signal;

a feedforward command circuit coupled to the command signal circuit for generating a feedforward command signal; and a second summing circuit coupled to the feedforward command circuit that combines the feedforward command signal and the composite output signal to produce a corrective signal that is transmitted to the actuator.

2. The system of claim 1 further comprising:

a low pass filter coupled to the accumulation circuit and the accelerometer for receiving the at least one acceleration signal and passing substantially all signals that do not exceed a predetermined frequency to the accumulation circuit.

3. The system of claim 2 further comprising:

a plurality of sensors, mounted on the vehicle, for generating signals relating to vehicle motion; and an attitude vector circuit, coupled to the command signal circuit and the sensors, for receiving as input, a third command signal from the command signal circuit and an attitude feedback signal from the sensors;

wherein the attitude vector circuit processes the third command signal input and the attitude feedback signal from the sensors and outputs an attitude error signal, corresponding to the vehicle attitude, to the first summing circuit;

wherein the first summing circuit utilizes the attitude error signal to produce the composite output signal.

4. The system of claim 2 further comprising:

a plurality of sensors mounted on the vehicle for generating signals relating to vehicle motion; and a third summing circuit, coupled to the command signal circuit and the vehicle, for summing a fourth command signal received from the command signal circuit and a rate feedback signal received from the sensors thereby producing a rate error signal;

wherein the first summing circuit utilizes the rate error signal to produce the composite output signal.

5. The system of claim 1 wherein the feedforward command signal is a function of a stability signal and a trim break frequency.

6. The system of claim 2 wherein the vehicle comprises a helicopter and the actuator is coupled to a swashplate.

7. The system of claim 6 wherein the helicopter includes a bearingless main rotor.

8. A method for reducing destabilizing forces of a vehicle comprising the steps of:

generating acceleration feedback signals corresponding to sensed vehicle motion;

generating a plurality of command signals corresponding to pilot input commands;

summing at least one of the acceleration feedback signals and a first command signal thereby producing an acceleration error signal representative of the difference between roll acceleration response of the vehicle and the pilot command signals;

multiplying the acceleration error signal by a gain to produce an amplified acceleration error signal representative of the compensation required to cancel undesired roll motion of the vehicle;

summing the amplified acceleration error signal and a second command signal to produce a composite output signal;

summing the first command signal with a trim break frequency signal to produce a resulting signal;

summing the resulting signal with a stability derivative signal to produce a feedforward command signal;

summing the feedforward command signal and the composite output signal to produce a corrective signal; and outputting the corrective signal to the actuator thereby causing the actuator to change position in response to the corrective signal.

9. The method of claim 8 further comprising the step of:

filtering the acceleration feedback signals received from the vehicle to remove substantially all signals that exceed a predetermined frequency thereby producing a low frequency signal.

10. The method of claim 9 further comprising the steps of:

generating rate feedback signals based on sensed vehicle motion;

summing one of the rate feedback signals and a third command signal to produce a rate error signal;

outputting the rate error signal to a summation circuit for producing the composite output signal.

11. The method of claim 9 further comprising the steps of:

generating an attitude feedback signal based on sensed vehicle motion;

summing one of the attitude feedback signals and a fourth command signal to produce an attitude error signal;

outputting the attitude error signal to a summation circuit for producing the composite output signal.

12. An apparatus for reducing destabilizing effects in a vehicle comprising:

at least one actuator, mounted on the vehicle, for controlling movement of at least one portion of the vehicle;

a microcomputer coupled to the at least one actuator for receiving input signals therefrom and transmitting output signals thereto;

at least one accelerometer coupled to the microcomputer and mounted on the vehicle for sensing motion of the vehicle and transmitting acceleration feedback signals to the microcomputer;

at least one control device coupled to the microcomputer for generating control signals corresponding to at least one pilot command and transmitting the control signals to the microcomputer; and a feed forward command circuit, coupled to the microcomputer, for generating feedforward command signals, wherein the microcomputer utilizes the acceleration feedback signals received from the at least one accelerometer, the feedforward command signals received from the feedforward command circuit and the control signals received from at least one control device to generate an output signal and transmits the output signal to the at least one actuator for adjusting the at least one actuator.

13. The apparatus of claim 12 further comprising:

a plurality of sensors, coupled to the microcomputer and mounted on the vehicle, for sensing motion and transmitting one or more rate feedback signals to the microcomputer;

wherein the microcomputer utilizes the one or more rate feedback signals received from the sensors to generate the output signal.

14. The apparatus of claim 13 wherein the plurality of sensors transmit one or more attitude feedback signals, corresponding to sensed vehicle attitude to the microcomputer;

wherein the microcomputer utilities the one or more attitude feedback signals received from the sensors to generate the output signal.

15. The apparatus of claim 12 wherein the vehicle comprises a helicopter and the actuator is coupled to a swashplate.

16. The apparatus of claim 15 wherein the helicopter includes a bearingless main rotor.

17. A method for reducing destabilization effects in a vehicle comprising:

generating a plurality of command signals from pilot input corresponding to desired vehicle motion;

generating an acceleration feedback signal corresponding to vehicle motion sensed by at least one non-pilot controlled sensor;

generating an acceleration error signal representative of the sum of a first command signal and the acceleration feedback signal, the acceleration error signal indicative of the difference between a roll acceleration response and the command signals from the pilot input;

multiplying the acceleration error signal to produce an amplified acceleration error signal representative of compensation necessary to cancel undesired roll motion of the vehicle;

combining a second command signal with the amplified acceleration error signal to produce a composite signal;

generating a feedforward signal from a feedforward circuit;

combining the feedforward signal with the composite signal to produce a corrective command signal:

outputting the corrective command signal to an actuator; and adjusting the actuator in response to the corrective command signal transmitted to the actuator.

18. The method of claim 17 further comprising:

generating a rate command signal corresponding to pilot input;

generating a rate feedback signal corresponding to sensed vehicle motion;

generating a rate error signal that represents the sum of the rate command signal and the rate feedback signal;

summing the acceleration error signal and the rate error signal to produce the composite signal.

19. The method of claim 17 further comprising:

generating an attitude command signal corresponding to pilot input;

generating an attitude feedback signal corresponding to sensed vehicle motion;

generating an attitude error signal that represents the sum of the attitude command signal and the attitude feedback signal;

summing the acceleration error signal and the attitude error signal to produce the composite signal.

20. The method of claim 17 wherein the feedforward command signal receives input corresponding to vehicle stability.

21. A method for generating an acceleration error signal in a flight simulation apparatus comprising:

generating an acceleration feedback signal corresponding to the flight simulated apparatus motion;

generating a command signal corresponding to a pilot input;

generating an acceleration error signal representative of the sum of the acceleration feedback signal and the command signal;

generating a feedforward signal from a feedforward circuit;

combining the feedforward signal and the acceleration feedback signal to produce a corrective signal; and utilizing the corrective signal to determine flight path stability of the flight simulation apparatus.

* * * * *